United States Patent
Venturelli et al.

(10) Patent No.: US 6,766,691 B2
(45) Date of Patent: Jul. 27, 2004

(54) METHOD AND APPARATUS FOR OPTICAL ACOUSTIC MOLDING

(75) Inventors: Philip A. Venturelli, Bethesda, MD (US); Fred E. C. Culick, Altadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 10/338,307

(22) Filed: Jan. 8, 2003

(65) Prior Publication Data

US 2003/0154790 A1 Aug. 21, 2003

Related U.S. Application Data

(60) Provisional application No. 60/347,613, filed on Jan. 8, 2002.

(51) Int. Cl.[7] .............................. C08F 2/48; C08K 3/04
(52) U.S. Cl. ...................... 73/570.5; 240/401; 240/136
(58) Field of Search ...................... 73/570.5; 181/0.5; 250/251; 219/121.78, 121.79, 121.8, 121.81; 264/401, 1.36, 69, 500, 517

(56) References Cited

U.S. PATENT DOCUMENTS

| | | | | |
|---|---|---|---|---|
| 4,841,495 A | * | 6/1989 | Danley et al. | 367/191 |
| 5,006,266 A | * | 4/1991 | Schram | 210/748 |
| 5,096,017 A | * | 3/1992 | Rey et al. | 181/0.5 |
| 5,206,504 A | * | 4/1993 | Sridharan | 250/251 |
| 5,679,722 A | * | 10/1997 | Tamura | 522/96 |
| 5,820,811 A | * | 10/1998 | Murakami et al. | 264/401 |
| 6,036,910 A | * | 3/2000 | Tamura et al. | 264/401 |
| 2002/0050489 A1 | * | 5/2002 | Ikegami et al. | 219/121.69 |

* cited by examiner

*Primary Examiner*—Hezron Williams
*Assistant Examiner*—Rose M. Miller
(74) *Attorney, Agent, or Firm*—Daniel L. Dawes; Myers Dawes Andras & Sherman LLP

(57) ABSTRACT

Acoustic energy is used to control the shape of a particle or particle cluster for the purpose of inducing a phase and hence density change as a result of exposure to radiation. This process, known as optical acoustic molding, employs an acoustic transducer and reflector positioned around a particle or particle cluster to generate standing waves. These standing waves apply forces to points on the particle's surface. The locus of such points represents a three-dimensional pressure function, which will ultimately cause the particle or particle cluster to acquire a predefined shape. Once the particle or particle cluster has attained the desired shape or density, a radiation source induces rapid melting or solidification (i.e. rapid change in density) of the particles.

16 Claims, 5 Drawing Sheets

METHOD AND APPARATUS FOR OPTICAL ACOUSTIC MOLDING

RELATED APPLICATIONS

The present application is related to U.S. Provisional Patent Application serial No. 60/347,613, filed on Jan. 8, 2002, which is incorporated herein by reference and to which priority is claimed pursuant to 35 USC 119.

BACKGROUND OF THE INVENTION

1. Field of the Invention

This invention relates to the field of droplet or particle cluster formation and in particular to a method of shaping and inducing a density change in a particle cluster by means of a combination of acoustic and optical energy.

2. Description of the Prior Art

The word "particle" in this document shall denote a volume element that contains a single body of material that is in either a liquid or a solid phase. A particle has a mass density and a shape, which is defined by the surface boundary of the material. Two examples of particles are (1) a liquid droplet or (2) a metal crystal. The word "particle cluster" in this document denotes a plurality of particles that are close enough one to another as to influence each other's motion either directly (through collisions) or indirectly (due to interactions with external forces). A particle cluster has an average number density and a shape, which defines the spatial distribution of particles. Two examples of particle clusters are (1) a group of several liquid droplets and (2) a group of several metal crystals.

Acoustic levitation of an object within a chamber has heretofore been accomplished by the use of one or a few acoustic standing wave patterns, wherein the acoustic wavelength was between about one-quarter and twice the length of the chamber. The chamber had to have highly sound reflective walls to provide a Q (a measure of sound reflectance) of at least about fifty. The object remained at a region of low acoustic pressure, because as it drifted in a particular direction, radiation pressure of the standing wave pattern pushed the object back. While harmonics of a fundamental or lowest frequency could be used, these higher harmonics restricted the size of the object. For these acoustic levitators, the object size had to be small compared to the acoustic wavelength, such as no more than about 20% of the wavelength. U.S. Pat. No. 4,573,356 describes the general state of the art of the use of acoustic standing wave patterns to levitate objects and is incorporated by reference.

The prior art use of acoustic standing wave patterns, involved the use of one or only a few transducers which all emitted sound of relatively long wavelengths within a high Q chamber. A large sample requires a very long wavelength and long chamber. It is difficult to produce high intensity sound of long wavelengths and corresponding low frequencies. The force that could be applied to a levitated object was limited by the small number of transducers that could be easily used. Movement and shaping of the object required complicated control or required alteration of the chamber dimensions.

Acoustically levitating an object with acoustic energy from a large number of transducers to avoid the need for a chamber of high Q for simplified control of the position, shape of large objects with respect to the sound wavelength is known in the art. Guigne et al. U.S. Pat. No. 5,500,493 describes such an acoustic levitation apparatus. Acoustic energy is used to position an object, which simplifies the application of forces in defined directions to the object and which allows the application of large forces to the object. The system includes transducers that direct separate acoustic beams at the object with the system constructed so the beams do not create standing wave patterns. A plurality of beams whose phases at the object are not closely controlled, are directed at different surface areas of the object so the beams do not substantially overlap at the object and create possible canceling effects. A very large force is applied to the bottom of an object lying in a gravity environment, by directing a plurality of beams at the same area at the bottom of the object, and with the beams being controlled so they are substantially in phase at the object area. This plurality of beams can also replace one or all of the transducers to provide much stronger forces to position and manipulate the object. The wavelength of the acoustic energy in each beam is preferably much less than one-tenth the diameter of the object in order to obtain efficient momentum transfer of energy to the object. Guigne, however, fails to recognize that such a system can be used for controlling the shape or average number density of particle clusters.

Kaduchak et al U.S. Pat. No. 6,467,350 is also directed to acoustic levitation of particles. However, Kaduchak did not recognize the utility of acoustically shaping the particle cluster for the purpose of rapid prototyping. The standing-wave field produced by an acoustic levitation device is strongly dependent upon the spatial alignment of the system components and often requires moderate to high electrical input power levels to drive the acoustic generators and achieve the desired levitation. This is especially true for levitating solid and liquid samples in air. To achieve the foregoing Kaduchak employed a method for concentrating particles suspended in a fluid including the steps of matching the distance between reflector and radiating element or between two radiating elements, i.e. tuning the resonant levitation cavity, to the acoustic resonance of the interior volume thereof when filled with the fluid; applying periodic electrical excitation to the acoustic radiating element (i.e. a piezoelectric transducer) such that resonant acoustic waves are generated in the interior volume of the levitation cavity, and subjecting the fluid having particles suspended therein to the steady-state force pattern formed by the resonant acoustic waves such that the particles move to the region of the steady-state force pattern and are concentrated.

Kaduchak also disclosed an apparatus for concentrating particles suspended or entrained in a fluid comprising a cylindrical piezoelectric transducer having a hollow interior portion and wherein the breathing-mode acoustic resonance of the cylindrical piezoelectric transducer is matched to the acoustic resonance of the interior portion thereof when the interior portion or levitation cavity is filled with the fluid. A function generator applies periodic electrical excitation to the surface of the cylindrical piezoelectric transducer such that resonant acoustic waves in are generated in the hollow interior portion of the cylindrical piezoelectric transducer. A means is provided for introducing the fluid having particles suspended or entrained therein into the region of the equilibrium force pattern formed by the resonant acoustic waves such that the particles move to the region of the equilibrium force pattern and are concentrated.

Photopolymers are well known in the art and have been used for the construction of various devices. For example extensive use of photopolymers has been made in printing. In flexographic printing as one example, also known as relief printing, ink is transferred from a pool of ink to a substrate by way of a printing plate. The surface of the plate is shaped so that the image to be printed appears in relief, in the same way that rubber stamps are cut so as to have the printed image appear in relief on the surface of the rubber. Typically, the plate is mounted on a cylinder, and the cylinder rotates at high speed such that the raised surface of the printing plate contacts a pool of ink, is slightly wetted by the ink, then exits the ink pool and contacts a substrate web, thereby transferring ink from the raised surface of the plate to the substrate to form a printed substrate.

Photopolymerizable resin compositions generally comprise an elastomeric binder, herein sometimes referred to as a prepolymer or an oligomer, at least one monomer and a photoinitiator. To prepare the plates, there is generally formed a photopolymerizable layer interposed between a support and one or more cover sheets that may include slip and release films to protect the photosensitive surface. Prior to processing the plate, the cover sheets may be removed, and the photosensitive surface is exposed to actinic radiation in an imagewise fashion. Upon imagewise exposure to actinic radiation, polymerization, and hence, insolubilization of the photopolymerizable layer occurs in the exposed areas. Treatment with a suitable developer removes the unexposed areas of the photopolymerizable layer leaving a printing relief, which can be used for flexographic printing.

Many different elastomeric materials have been investigated for the preparation of the photopolymer plates. These include polyamide-based photopolymer (containing a polyamide as an essential component which dissolves or swells in a washout solution (typically, water, alkaline aqueous solution, or alcohol), a polyvinyl alcohol-based photopolymer (containing polyvinyl alcohol as an essential component), a polyester-based photopolymer (containing a low-molecular weight unsaturated polyester as an essential component), an acrylic-based photopolymer (containing a low-molecular weight acrylic polymer as an essential component), a butadiene copolymer-based photopolymer (containing a butadiene or isoprene/styrene copolymer as an essential component), or a polyurethane-based photopolymer (containing polyurethane as an essential component). Methacrylate- or acrylate-terminated polyurethane oligomers diluted with various acrylate or methacrylate monomers, along with a photoinitiator, are described in U.S. Pat. Nos. 4,006,024 and 3,960,572, which are incorporated herein by reference. The polyurethane oligomers of the '024 and '572 patents are derived from a diisocyanate such as toluene diisocyanate (TDI) and various polyester polyols or polyether polyols such as polypropylene glycol adipate, polyethylene oxide/propylene oxide copolymer, or a mixture thereof. U.S. Pat. Nos. 4,057,431, 4,139,436, 4,221,646 and 3,850,770, which are all incorporated by reference, all teach the use of photosensitive ethylenically unsaturated polyether urethanes for the production of printing plates. In each of these patents, the polyether is either polyethylene oxide, polypropylene oxide or a copolymer of the two. U.S. Pat. No. 5,228,571, which is incorporated herein by reference in its entirety, teaches the use of photosensitive ethylenically unsaturated polyether urethanes for the production of printing plates wherein at least 20% of the polyether diol is specifically poly(tetrahydrofuran) (polyTHF).

However, prior to the instant invention, the utility of combining an acoustic shaping and photopolymerization was not known. There is a need in the art for new methods of creating microfabricated components for electronics, optics and other applications.

It is an object of the invention to provide a process for achieving the control of the shape of a particle or particle cluster via acoustic levitation and acoustic manipulation. One use of this process is to expose the particle or particle cluster to electromagnetic radiation for the purposes of inducing a change in its molecular structure. One application of this process is to use UV radiation to crosslink a photopolymer droplet. This may be useful in the rapid prototyping industry as a new means of microcomponent fabrication.

SUMMARY OF THE INVENTION

Acoustic energy is used to control the shape of a particle or particle cluster for the purpose of inducing a phase and density change as a result of exposure to radiation. This process, known as optical acoustic molding, employs pairs of opposing ultrasonic transducers positioned around a particle or particle cluster to generate standing waves. These standing waves apply forces to points on the particle's surface. The locus of such points represents a three-dimensional pressure function, which will ultimately cause the particle or particle cluster to acquire a predefined shape. Once the particle or particle cluster has attained the desired shape or density, a radiation source induces rapid melting or solidification (i.e. rapid change in density) of the particles.

More particularly, the illustrated embodiment of the apparatus positions a particle or particle cluster within a contained volume. The apparatus comprises an acoustic transducer means or system for generating acoustic energy to alter the shape of the particle or particle cluster. The acoustic transducer means comprises a single or triple axis acoustic levitation system. A controller coupled to the acoustic transducer means controls the acoustic transducer means to generate standing waves in the contained volume to levitate the particle or particle cluster and to shape the particle or particle cluster. A radiation source delivers radiation to the particle or particle cluster to induce a change in density in the particle or particle cluster. In this specification "density" is defined as "mass density" in the case of the particle, and as "average number density" in the case of the particle cloud or plurality of particles.

In the illustrated embodiment the particle or particle cluster contains one or more droplets formed from a photopolymerizable solution. The suspension means is an acoustic suspension means.

The apparatus further comprises a particle or particle cluster sensing means used to monitor the shape of the particle or particle cluster and to generate a shape output signal for controlling the acoustic transducer means. The particle cluster sensing means monitors the average number density of a particle cluster.

At least one standing wave is generated by the acoustic transducer means and is used to create at least one pressure node for stabilizing the particle or particle cluster. The standing wave causes the particle or particle cluster to conform to a desired shape, and causes the particle cluster to conform to a desired average number density.

The radiation source comprises a radiation controller which determines radiation exposure time to induce a desired shape or density in the particle or particle cluster.

The controller comprises a timer, a shutter mechanism, and electronics capable of controlling the duration and intensity of exposure of the radiation source to the particle or particle cluster.

The object of the invention in part is to manipulate the droplet, particle or cloud shape to optimize or control the interaction of the radiation with the droplet, particle or cloud shape. Such shape control or molding can then be used in other processes where the treated droplet, particle or cloud of particles is deposited or disposed onto a surface of another object as a coating or layering.

The invention is also to be expressly understood as methods for using the above apparatus and for performing the functions of the apparatus disclosed above.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

Figure 1:
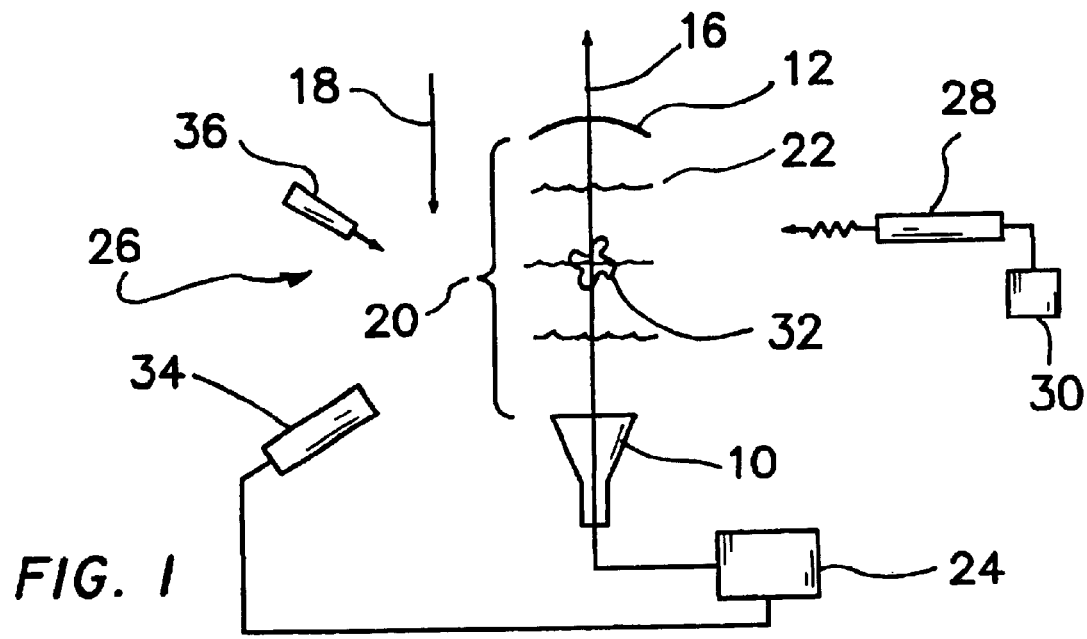
FIG. 1 is a diagrammatic side view of a single axis levitator in which acoustic molding according to the invention is practiced.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The invention provides a suspension apparatus, generally denoted by reference numeral 26, having a suspension mechanism capable of adjusting or maintaining the position of a particle or particle cloud 32 within a contained volume, an acoustic transducer apparatus 10, 24 for generating acoustic energy to alter the shape of the particle or particle cloud 32; and a radiation source 28 capable of delivering radiation to the particle or particle cloud 32 in such a manner as to induce change in density in any part of the particle or particle cluster 32. The particle or particle cluster 32 is injected into the contained volume 14 or onto a nodal plane 22 by means of a conventional liquid or particle injector 36. The radiation source 28 is preferably an ultraviolet, visible or infrared radiation source, but can be a radiation source of any suitable wavelength.

Generally, a particle usable with the invention has a diameter of less than 250 microns. The suspension apparatus 26 includes a radiation control subsystem 30 for determining a time of exposure to the radiation in order to induce a desired shape or density in the particle or particle cluster. The control apparatus, symbolically denoted by reference numeral 30 in the illustrated embodiment, comprises a conventional timer, a conventional shutter mechanism, and conventional electronics capable of controlling the duration and intensity of exposure of the radiation source 28 to the particle or particle cluster, generally denoted by reference numeral 32.

The particle or particle cluster 32 to be suspended may contain a photopolymerizable solution. For example, the particle or particle cluster can contain a photoploymerizable monomer or a photoexcited initiator. One of skill in the art will recognize that the wavelength and intensity of the radiation source 28 should be matched with the photopolymerizable solution, or with the absorption wavelength of the material should it contain metal crystals.

In one embodiment, the suspension mechanism 26 is an acoustic suspension mechanism. While acoustic levitation has been explored for over one hundred years, its true capabilities for materials manipulation have only recently been exploited. In 1962 Gor'kov derived a general theory of a radiation force potential for a particle of a specific radius in an acoustic field. This theory was based on ideal gases. However, it provided sufficient generality to be applicable to arbitrary acoustic fields used for levitation. It was not, however, until 2001 that Gor'kov theory was applied to the optimization of an actual acoustic levitator by Xie et al. This enabled Xie et al. to modify the structure of the acoustic field so as to levitate extremely high-density matter (iridium: 22.6 g/cm$^3$). This marked an important milestone for acoustic levitation by demonstrating a level of understanding, which could be applied to the design acoustic levitators with advanced manipulation capabilities. By combining this knowledge with flow measurement and field visualization techniques, such as particle image velocimetry and Schlieren laser optics, it is now possible to develop techniques based on acoustic levitation for a host of remarkable applications in materials science.

Particle image velocimetry (PIV) is a technique where a pair of images is captured within a short time interval, and the particle displacement from the two images is computed. The time interval is chosen so that the displacement during that time period is small enough to approximate the instantaneous velocity. Applications of this sort of velocimetry include deformation gauging of speckle-sprayed surfaces of deformable solid objects, velocity measurement of the discrete phase (solid particles, droplets, and bubbles) in a two-phase flow, and continuous-phase fluid flows seeded with particles.

It has been known for some time that a refractive index gradient such as produced by a concentration gradient in a fluid such as a gas, liquid or supercritical fluid, will cause deflection of light passing through the gradient. The optical method of observing and measuring the deflection of light caused by refractive index gradient fields is generally referred to as Schlieren optics. These methods are useful in studying plasmas where very complicated toroidal and parabolic shapes are generated.

The primary concern in the present application lies in studying the feasibility of acoustic molding to capture, transport, and shape powdered material. The dynamical analysis can be broken down into three parts: the acoustic field in absence of particles, the interaction between the acoustic field and a particle, and interaction between several particles in presence of acoustic field.

Consider first, an overview of the modern understanding of acoustic levitation. Acoustic radiation pressure is the underlying process that enables acoustic levitation; it is the result of the nonlinear relationship between the instantaneous pressure and velocity of the acoustic medium. For small objects (where radius $R_s$ is less than the acoustic wavelength $\lambda$) in an intense sound field, significant pressure gradients can be generated over the surface of an object resulting in an appreciable net force. A sufficiently strong acoustic field can thus be used to levitate an object against the force of gravity.

The radiation force produced by a standing wave is greater than that produced by a progressive wave, namely by the order of $(R_s/\lambda)^3$ as compared to the order of $(R_s/\lambda)^6$. Consequently acoustic levitation typically employs standing waves. There are two elementary configurations of an acoustic levitator: (1) single axis; and (2) triple axis. The single axis levitator as diagrammatically shown in FIG. 1 employs an acoustic driver 10, which is typically a flat circular transducer horn designed to resonate at ultrasonic frequencies, and a reflector 12 oriented facing each other sharing a central axis. The triple axis configuration of FIG. 2 has three single axis levitators 10a–12a, 10b–12b, and 10c–12c, sharing the same control volume 14, i.e. volume within which matter may be stably levitated, with axes oriented normal to each other. From a cost and convenience standpoint, the single axis configuration of FIG. 1 is preferable as it allows free access to the control volume along all radial directions. It has been observed that reflectors 12 with properly curved surfaces will enhance the levitation effect considerably.

A single driver 10 and a reflector 12 can be used to generate a high-intensity acoustic standing wave along a single axis 16 as shown in FIG. 1. This standing wave has a circularly symmetric, radially varying acoustic field in directions normal to the axis 16. The driver-reflector axis 16 is parallel to the direction of the gravitational vector 18, and the standing wave is used to provide the lifting force required for levitation. The radial variations of the sound field perpendicular to this axis must be controlled in order to maximize the lateral force required for the localization of the sample.

The driver 10 and the reflector 12 define the boundary of an acoustic resonant cavity, generally denoted by reference numeral 20. The acoustic field in cavity 20 has alternating nodal and antinodes planes 22. By placing the driver 10 and reflector 12 several wavelengths apart, several nodal planes 22 are created, each of which is capable of suspending an object.

This driven surface or plane 22 vibrates in an axisymmetric Bessel-shaped mode and serves to couple mechanical energy to the acoustic medium lying between driver 10 and reflector 12. The nature of the vibration of the aluminum plate forming the transducing portion of driver 10 is such that the acoustic field in cavity 20 generated by the driver is axisymmetric. As a result, secondary acoustic forces are developed that exert radial restoring forces on objects suspended in the field. These radial forces drive objects toward the axis 16 of symmetry of the levitator. This favorable effect prevents suspended particles from migrating out of the acoustic region in the presence of disturbances, as would be the case for a perfectly planar acoustic field. This effect is augmented by the concave reflecting surface of reflector 12, which focuses acoustic energy along the driver axis 16. Hence both vertical and horizontal stability can be achieved with a single device.

In one embodiment, the suspension apparatus includes a control subsystem 24 for generating a pressure function implemented by the acoustic transducer apparatus or driver 10. The standing waves are used to cause the droplet to conform to a desired geometry. The acoustic control subsystem 24 comprises a software controlled microprocessor or is implemented in equivalent hardware. The control subsystem 24 generates the pressure waves through computation from well understood theoretical principles and/or responds using a feedback mechanism supplied by a droplet sensing system, comprised of a video camera 34 and subsystem 24, to empirically generate or control the pressure waves. Camera 34 and subsystem 24 form a computer imaging system well known to the art and means for pattern recognition of particle or particle cluster 32 to control driver 10 in the case of FIG. 1 or drivers 10a, 10b and 10c in the case of FIG. 2.

Figure 2:
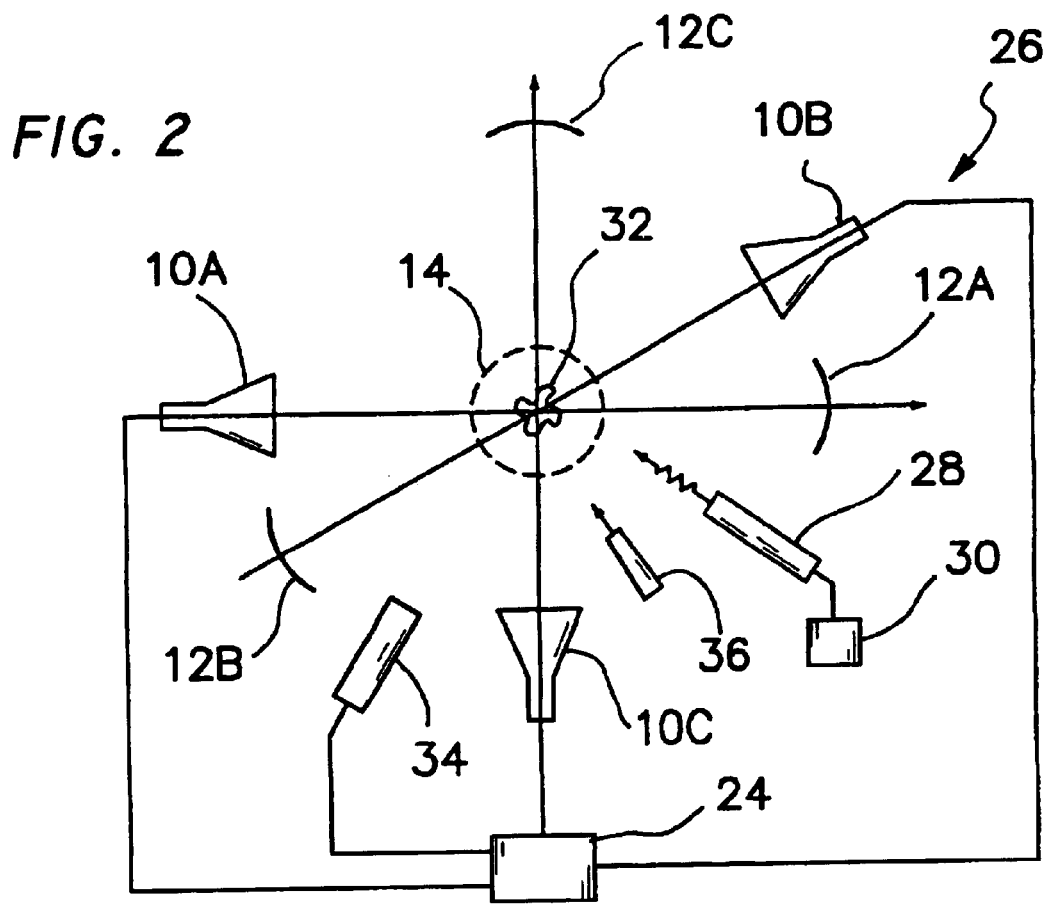
FIG. 2 is a diagrammatic side view of a three axis levitator in which acoustic molding according to the invention is practiced.

The physics utilized in the embodiments of FIGS. 1 and 2 revolves around the use of a highly directive acoustic transducer 10 or transducers 10a, 10b and 10c to apply standing wave "beams" to a levitating particle or particle cluster 32. These standing wave beams form acoustic tweezers, which apply pressure to particular points on the surface of particles 32. By precisely controlling these tweezers, it is possible to produce a variety of different particle or particle cluster shapes or densities using well known principles.

An concrete example will illustrate the invention. The following experiment used acoustic manipulation of droplets under varying gravitational conditions. Experiments were carried out in two separate laboratories, namely one on the ground and a second on board the NASA KC135 aircraft in microgravity.

It is known that it is possible to flatten a water droplet into a disk in a gravitational field of 1G with the single-axis levitator system, although mechanism behind this process is not well understood. In order to investigate this phenomenon, a series of characterization measurements was performed to assess the changing acoustic field as a function of levitation cavity dimensions and microphone location. This included the characterization of intensity at reflector as a function of driving voltage for constant reflector position, the characterization of intensity at reflector as a function of reflector position for constant driving voltage, and the characterization of intensity at various near-axis locations as a function of reflector position for constant driving voltage.

The same measurements were repeated with a water droplet in place. The objective of these characterization measurements was to examine the relationship between the shape of the droplet (as recorded by a high-speed digital camera) and the acoustic intensity. Thus there was an investigation of droplet shape as a function of acoustic intensity at reflector, and an investigation of droplet shape as a function of acoustic intensity at various near-axis locations. Finally, it was of interest to study the droplet motion in order to understand to what extent the energy imparted to the droplet from its interaction with the acoustic field gives rise to body as opposed to surface forces, so there was an investigation of droplet motion as a function of acoustic intensity at various near-axis locations.

It is also known that it is possible to flatten a water droplet into a disk in microgravity with the single-axis levitator system. The mechanism behind this process is also not well understood, however the reduced role of gravity simplifies the governing dynamics by turning a system which experiences both body and surface forces into a system which experiences only surface forces. Therefore, the goal of the microgravity experiment is to use a simpler system to provide insight into the dynamics of the droplet shaping process in a 1G gravity field. This in flight or microgravity experiment involves studying both droplet shape and droplet motion as a function of both acoustic intensity and average acceleration in the following manner. Thus, there is an investigation of droplet shape as a function of acoustic intensity at the reflector, an investigation of average droplet motion as a function of acoustic intensity at the reflector, investigation of droplet shape as a function of average acceleration, and an investigation of average droplet motion as a function of average acceleration.

Figure 3:
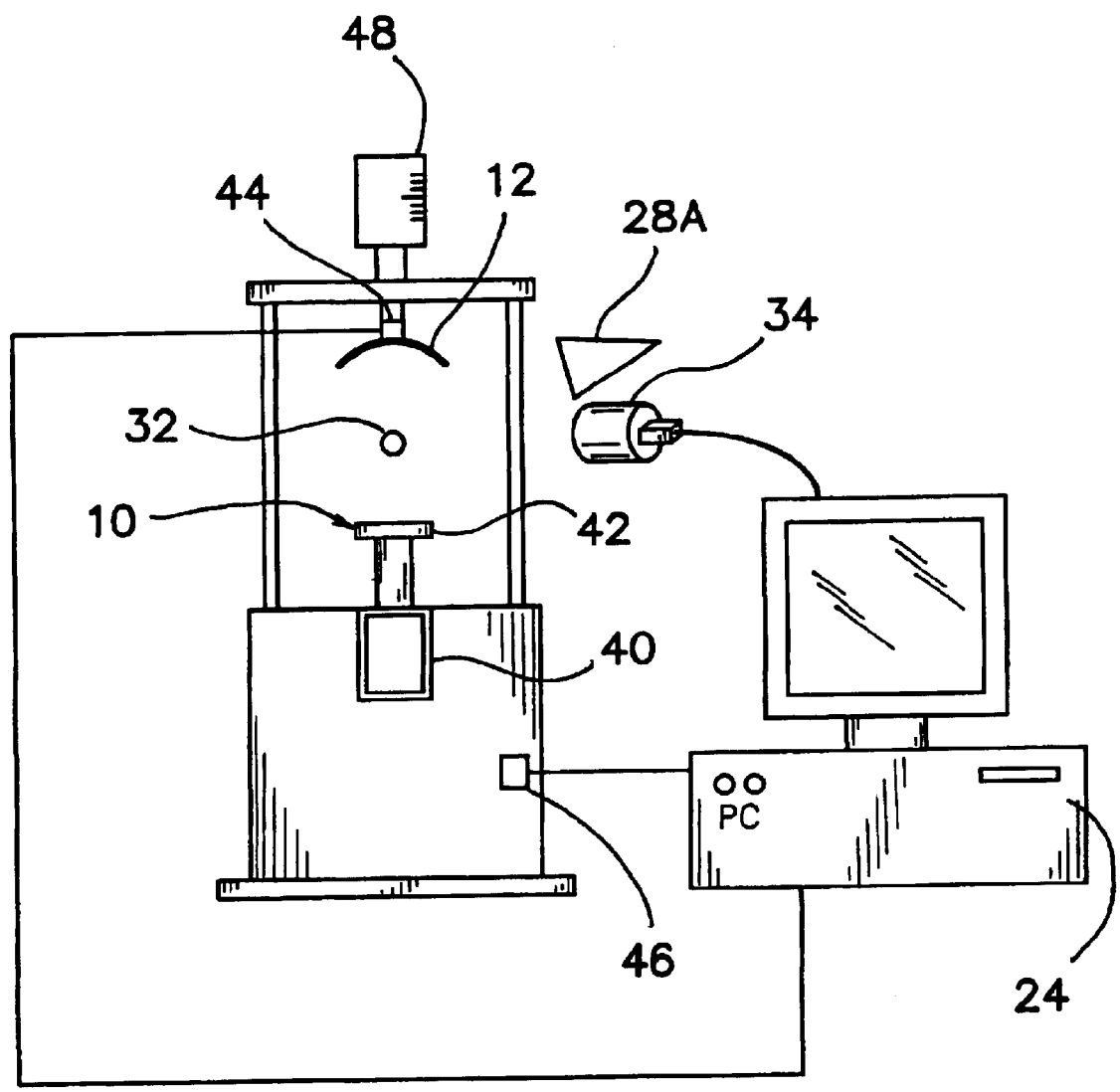
FIG. 3 is a block diagram of an experimental setup to validate the invention.
Figure 4:
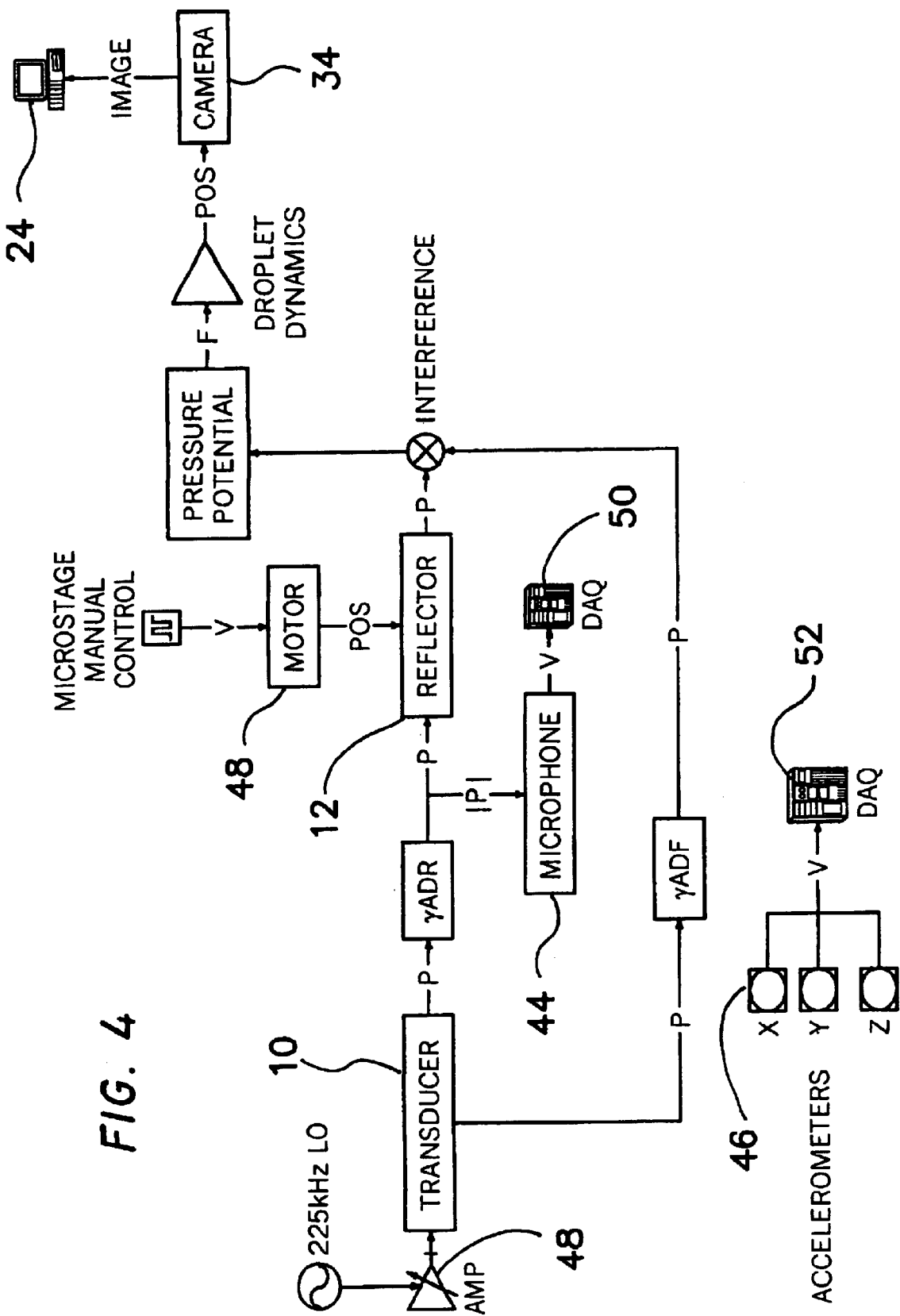
FIG. 4 is a block diagram which illustrates the dynamic relationship between the element of FIG. 3.

The experimental setup and the relationship between the different dynamical elements were as follows. As shown in FIG. 3 an oscillating plate driver 10 radiates ultrasound at 22.5 kHz. A piezoelectric element 40 and a brushed steel conical horn transducer 42 acts as a piston with face 3.1 cm in diameter. A 20-watt preamp and a 250 watt amplifier 48 shown in FIG. 4 with internal feedback matches the driving frequency to the transducer horn resonance peak which depends on temperature. FIG. 4 is a diagram of the signal processing pathways in the system in which some of the elements hardware or software controlled signal processes and other ones of them are related to the physical or acoustic processes whch occur in the acoustic cavity and materials such as the dampening ADR, the pressure potential at the nodes, the droplet dynamics, and the reflector dynamics. A reflector 12 can be displaced vertically along the beam axis thus altering the dimensions of the acoustic resonance cavity 14. Aluminum reflector 12 has a concave parabolic profile 3.9 cm in diameter. When the reflector 12 is placed at an integral number of acoustic wavelengths from the driver 10, the cavity 14 is tuned to a resonance and a single standing wave is dominant. The pressure amplitude as measured by a microphone 44 imbedded in the reflector 12 is approximately constant from one resonance to another. A piezoceramic microphone 44 is embedded in the reflector and a probe microphone (not shown) is mounted perpendicular to acoustic beam axis. At resonance, the pressure amplitude as measured by the reflector microphone can be adjusted. The pressure amplitude scales with the driving voltage applied to piezo crystal 40 in a nonlinear manner. During operation at high intensity levels, the temperature of the plate 42 increases. The resonance frequency varies with plate temperature. Orthogonally mounted accelerometers 46 provide translational acceleration data to computer 24 to be time-correlated with data from the microphone 44 and the camera 34. Computer 24 is provided with image acquisition under IEEE1394 standards, signal acquisition at 12-bit, 220 kHz bandwidth and software written to time-correlate signal and image streams. The software also analyzes video data to extract droplet position and diameter.

A light source 28a comprised of a bundle of nine super-luminescent LEDs forming a 4.5 mW superluminescent narrowband LED bundle is used to illuminate the droplet 32. A high-speed digital camera 34 is used to record droplet motion. High-speed digital monochrome camera 34 samples at 544 FPS at resolution 256×128 pixels. The droplet side profile seen through a 94 mm aperture with a 0.5× magnification lens, at distance of 9.5 cm between droplet and lens. The data from the camera 34 is transferred to a personal computer 24 where it is recorded. The data from the reflector and probe microphone is sampled by a data acquisition card inside the computer 24 and recorded on the hard drive. The embodiment of FIG. 3 is only a single-axis example of the acoustic levitation and shaping apparatus. Multi-axis configurations are possible.

The dynamical interactions in the system of FIG. 3 are represented in the block diagram of FIG. 4. γADR is the damping due to absorption and beam divergence between driver 10 and reflector 12, and γADF is the damping due to absorption and beam divergence between reflector 12 and focal point 14. The diagram shows the interaction at the concave reflector's focal point between the spherical wave and the original standing wave.

In the ground experiments first measurements were made to characterize the intensity at reflector 12 as a function of varying driving amplitude for a constant reflector position by the following procedure. Reflector 12 was placed at a predetermined position and the driving amplitude set to a predetermined value as recorded by reflector microphone 44. The reflector microphone voltage was then recorded via a DAQ system 50 sampling at 60 kHz. The amplitude was then increased linearly to a predetermined value and then data recording terminated.

The intensity at reflector 12 was then characterized as a function of reflector position for a constant driving amplitude by the following procedure. The reflector 12 was placed at a position predetermined position, and the driving amplitude to set to a predetermined value as recorded by reflector mic 44. Data recording of the reflector microphone voltage via DAQ 50 system sampling at 60 kHz was then initiated. The reflector 12 was moved at a constant velocity to a position predetermined position and then data recording ended.

The characterization of intensity at various near-axis locations as a function of reflector position for constant driving amplitude was determined by the following steps. The reflector 12 was place at a predetermined position and the probe microphone was placed at a defined location. The driving amplitude to was set to a predetermined value and recorded by reflector microphone 44. Data recording was initiated of probe microphone voltage via DAQ system 50 sampling at 60 kHz. The reflector 12 was moved at constant velocity to a defined position and then recording of data ended.

Investigation of droplet shape as a function of acoustic intensity at reflector 12 was performed by the following procedure. The reflector 12 was placed at a defined position and the driving amplitude set to a predetermined value as recorded by reflector microphone 44. A predetermined amount of liquid droplets was injected via a syringe. Data recording of the reflector microphone voltage via DAQ system 50 sampling at 60 kHz was initiated. The recording of digital images of droplet at 544 fps was also started. The reflector 12 was moved at constant velocity to a defined position and then recording of data ended.

Investigation of droplet shape as a function of acoustic intensity at various near-axis locations proceeds in a similar manner. The reflector 12 was placed at a defined position and the driving amplitude set to a predetermined value as recorded by the reflector microphone. A predetermined amount of liquid droplets was injected via a syringe. Data recording of the probe microphone voltage via DAQ system 50 sampling at 60 kHz was initiated. The recording of digital images of droplet at 544 fps was also started. The reflector 12 was moved at constant velocity to a defined position and then recording of data ended.

In the flight experiments similar procedures were followed. Investigation of droplet shape as a function of acoustic intensity at the reflector 12 was made by placing the reflector 12 at a defined position such as the top limit and setting the driving amplitude to a defined value depending on droplet size as recorded by reflector microphone 44. Water is inserted via syringe into a nodal region until droplet begins to flatten. Then syringe is removed. Recording of the reflector microphone voltage is begun via DAQ system sampling 50 at 60 kHz with recording of digital images of the droplet at 544 fps. The reflector 12 is moved at constant velocity to a defined position and then recording of acoustic and video data is terminated.

Investigation of average droplet motion as a function of acoustic intensity at the reflector 12 proceeds similarly by placement of reflector 12 at a defined position such as the top limit and setting the driving amplitude to a defined value depending on droplet size as recorded by reflector microphone. Water is injected via a syringe into a nodal region until droplet begins to flatten, then the syringe removed. Recording of the reflector microphone voltage via DAQ system 50 sampling at 60 kHz with recording digital images of droplet at 544 fps is begun. The reflector 12 is moved at a constant velocity to a defined position and then recording of acoustic and digital image data is terminated.

Similarly investigation of droplet shape as a function of average acceleration proceeds by placement of reflector 12 at a defined position such as the top limit and setting the driving amplitude to a defined value as recorded by reflector microphone 44 depending on whether the droplet is large or small. Water is inserted via a syringe into a nodal region until droplet begins to flatten, and then the syringe is removed. Recording of digital images of droplet at 544 fps begins and the reflector 12 is moved at constant velocity to a defined position where recording of digital images is terminated. Finally, the investigation of droplet motion as a function of average acceleration proceeds by placement of reflector 12 at a defined position at the top limit and setting the driving amplitude to a defined value as recorded by reflector microphone 44 depending on whether the droplet is large or small. Water is injected via a syringe into a nodal region until droplet begins to flatten and then the syringe is removed. Recording of the digital images of droplet at 544 fps is performed while the reflector 12 is moved at constant velocity to a defined position where recording of digital images is terminated.

Figure 5A:
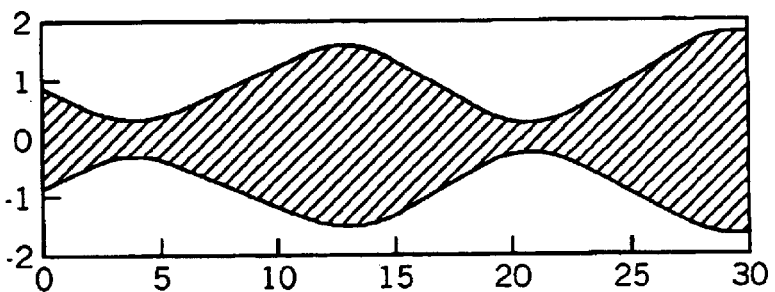
FIGS. 5a–5c are microphone signal output as the distances of 3.1, 3.5 and 3.7 cm respectively.
Figure 5B:
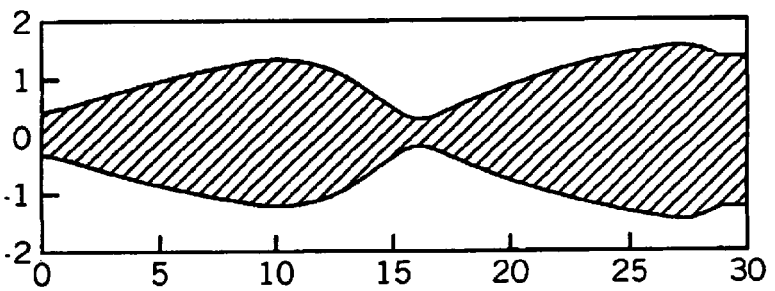
Figure 5C:
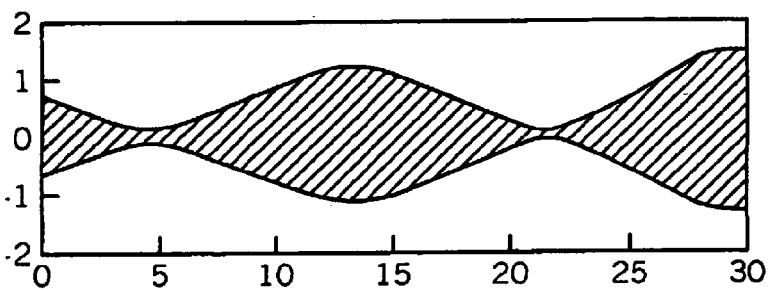
Figure 5D:
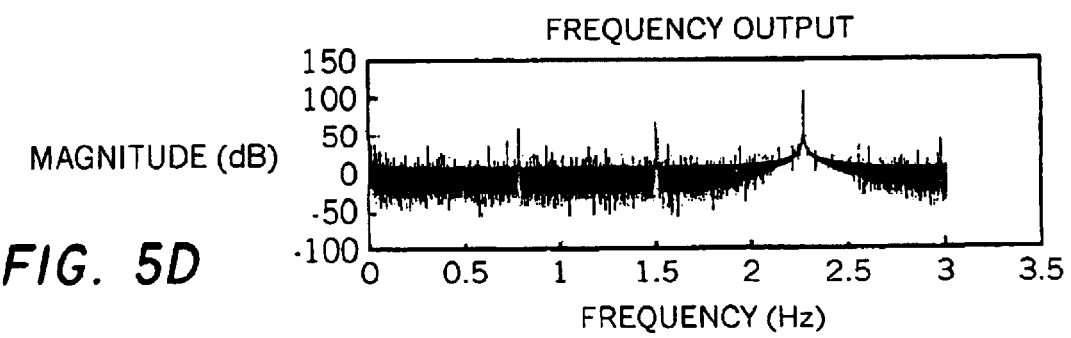
FIG. 5d is the power spectrum of the microphone signal.

In these experiments, a microphone 44 was fixed at a distance above the driver 10 and positioned close to the center axis. The microstage was used to slowly bring the reflector 12 down at a constant velocity from x=8.9 cm to 7.5 cm with a position measurement error of 0.1 cm. The pressure was recorded at 60 kSs with a 12-bit sample depth. The position of the microphone 44 relative to the driver was modified, and the experiment was repeated. The pressure envelope was observed in the context of the models proposed above. The time and frequency domain plots are shown in FIGS. 5a–5c with the microphone signal in units of volts and position in units of seconds (recall that the stage velocity was constant at 0.047 cm/s and thus the absolute position of the reflector 12 is given by X=8.9−0.047*t where t is the value in the plots). FIG. 5a is the microphone signal when X=3.1 cm, FIG. 5b for X=3.5 cm, and FIG. 5c for X=3.7 cm. FIG. 5d is the power spectrum of the microphone signal.

For a given microphone position, this experiment involved a simultaneous change in two parameters, namely the cavity dimensions and the position of the microphone 44 relative to the reflector 12. In the plots for X=3.1 cm and X=3.7 cm, the envelope appears to be a periodic function. This would make sense if changing the cavity dimensions simply scales the pressure gradients, causing consecutive maxima and minima in potential. However, we observe the obvious asymmetry in the envelope of the X=3.5 cm plot. This indicates that something more complex is happening.

Figure 6:
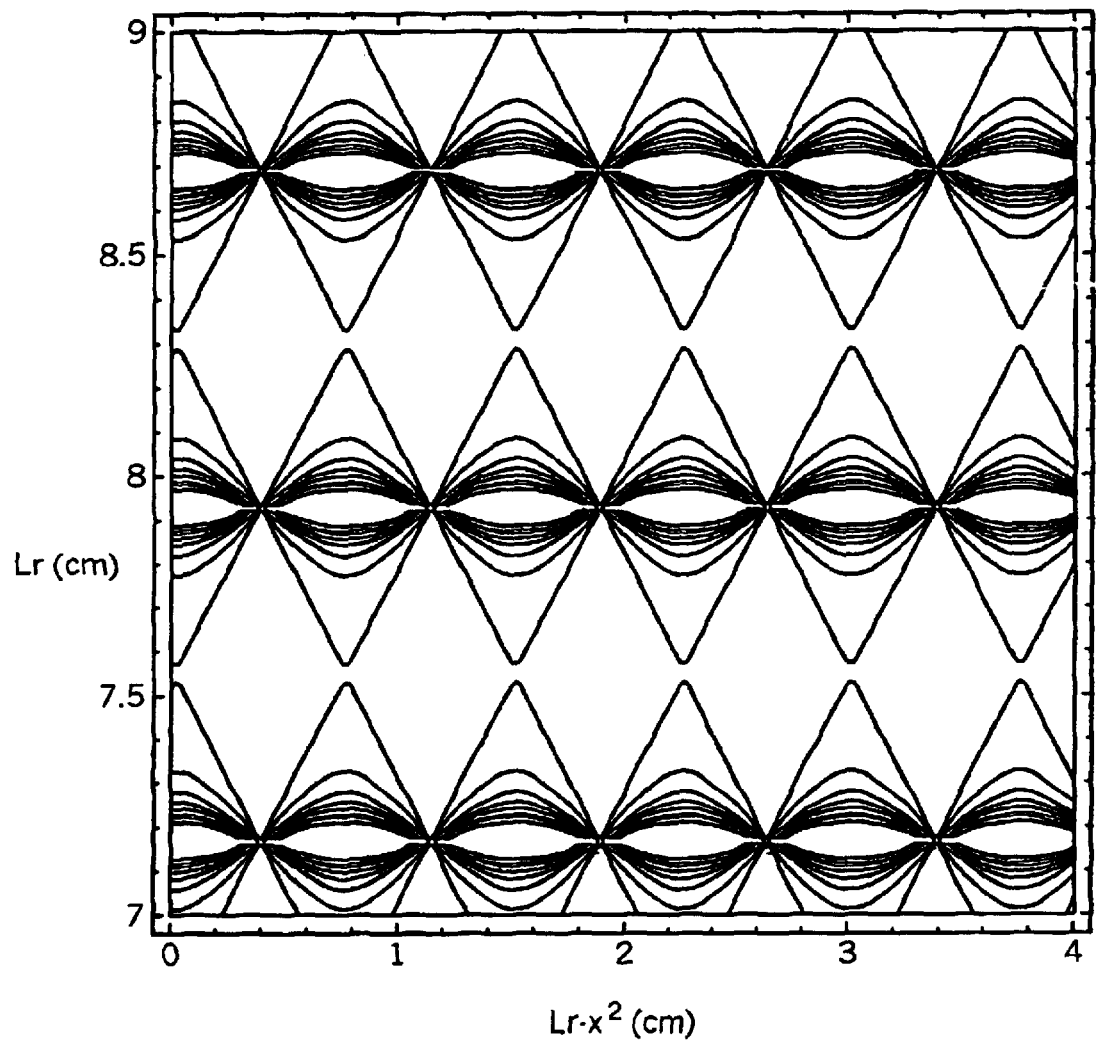
FIG. 6 is a simulation of the microphone signal from a one dimensional model.

It may be possible that the ability to shape the droplet stems from the fact that symmetry present for some positions along the X axis and absent for others. In particular, the points of asymmetry are most concentrated around the nodes. To better illustrate this notion, consider the simple one dimensional equation model. This model as shown in graph of FIG. 6 predicts the nodal pattern for the same experiment as performed above. $L_r$ is the distance from plate 40 to the focal point of reflector 12, which is essentially where the droplet(s), particle or particle cloud sits. X is the distance as measured from plate 40. The observed envelope can found by walking across the parameter space along a diagonal line from the lower left to the upper right. The different X values would specify the y intercept. This defines a trajectory which does not follow one of the symmetry axes of the gradient distribution. In fact the degree of asymmetry could be chosen by the selection of an X, according to this model. Hence, we conclude that the one dimensional wave equation model is relevant to the empirical observations and hence, which confirms the theoretical predictions in the previous section for the far-field regime.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus for positioning of a particle cluster of an aerosol or powdered material within a contained volume comprising:

an acoustic transducer means for generating acoustic energy to alter the shape of the particle cluster of the aerosol or powdered material;

a controller for generating standing waves in the contained volume to capture, transport, and shape the aerosol or powdered material; and a radiation source for delivering radiation to the particle cluster of the aerosol or powdered material to induce a change in density in the particle cluster of the aerosol or powdered material, the shape of the cluster being controlled by the controller to optimize absorption of energy from the radiation source.

2. The apparatus of claim 1, wherein the particle cluster contains one or more droplets formed from a photopolymerizable solution and wherein the radiation source is an optical source.

3. The apparatus of claim 1 wherein at least one standing wave is generated by the acoustic transducer means and is used to create at least one pressure node for stabilizing the particle cluster and wherein the standing wave causes the particle cluster to conform to a desired shape to optimize absorption of energy from the radiation source.

4. The apparatus of claim 1 wherein at least one standing wave is generated by the acoustic transducer means and is used to create at least one pressure node for stabilizing the particle cluster and wherein the standing wave causes the particle cluster to conform to a desired average number density to optimize absorption of energy from the radiation source.

5. The apparatus of claim 1 where the radiation source comprises a radiation controller which determines radiation exposure time to induce a desired shape or density in the particle cluster.

6. The apparatus of claim 5 where the controller comprises a timer, a shutter mechanism, and electronics capable of controlling the duration and intensity of exposure of the radiation source to the particle cluster to induce a desired shape or density in the particle cluster.

7. The apparatus of claim 1 where the acoustic transducer means is a single axis acoustic levitation system.

8. A method for positioning of a particle cluster of the aerosol or powdered material within a contained volume comprising:

generating acoustic energy to alter the shape of the particle cluster of the aerosol or powdered material;

controlling the generation of standing waves in the contained volume to levitate the particle cluster of the aerosol or powdered material and to shape the particle cluster of the aerosol or powdered material, the shape of the cluster being controlled to optimize absorption of energy from a radiation source; and delivering radiation to the particle cluster of the aerosol or powdered material from the radiation source to induce a change in density in the particle particle cluster of the aerosol or powdered material.

9. The method of claim 8 further comprising injecting the particle cluster in the form of one or more droplets formed from a photopolymerizable solution and where delivering radiation is comprised of delivering optical radiation to the particle cluster.

10. The method of claim 8 further comprising sensing the particle cluster to monitor the shape of the particle cluster, and generating a shape output signal for controlling a acoustic transducer means which generates the standing waves to control the shape of the cluster to optimize absorption of energy from a radiation source.

11. The method of claim 10 where sensing the particle cluster comprises monitoring the average number density of a particle cluster to optimize absorption of energy from a radiation source.

12. The method of claim 8 wherein generating acoustic energy the at least one standing wave causes the particle cluster to conform to a desired shape, and wherein generating acoustic energy the at least one standing wave causes the particle cluster to conform to a desired shape to optimize absorption of energy from the radiation source.

13. The method of claim 8 wherein generating acoustic energy the at least one standing wave causes the particle cluster to conform to a desired shape, and wherein generating acoustic energy the at least one standing wave causes the particle cluster to conform to a desired average number density.

14. The method of claim 8 where delivering radiation comprises determining a radiation exposure time to induce a desired shape or density in the particle cluster.

15. The method of claim 14 where controlling the generation of standing waves in the contained volume comprises controlling the duration and intensity of exposure of the radiation source to the particle cluster to induce a desired shape or density in the particle cluster.

16. The method of claim 8 where generating acoustic energy comprises generating an acoustic standing wave pattern in a single axis acoustic levitation system.

* * * * *